United States Patent [19]

Ohno et al.

[11] Patent Number: 5,547,819
[45] Date of Patent: Aug. 20, 1996

[54] SILVER HALIDE PHOTOGRAPHIC MATERIAL

[75] Inventors: Shigeru Ohno; Yasushi Hattori, both of Kanagawa, Japan

[73] Assignee: Fuji Photo Film Co., Ltd., Kanagawa, Japan

[21] Appl. No.: 403,485

[22] Filed: Mar. 14, 1995

[30] Foreign Application Priority Data

Mar. 16, 1994 [JP] Japan .................................. 6-045473

[51] Int. Cl.$^6$ .................. G03C 1/83; G03C 1/12
[52] U.S. Cl. ................ 430/522; 430/537; 430/581
[58] Field of Search .................. 430/581, 522, 430/537

[56] References Cited

U.S. PATENT DOCUMENTS

| | | | |
|---|---|---|---|
| 4,950,587 | 8/1990 | Roberts et al. | 430/570 |
| 5,051,351 | 9/1991 | Tabor et al. | 430/570 |

*Primary Examiner*—Lee C. Wright
*Attorney, Agent, or Firm*—Sughrue, Mion, Zinn, Macpeak & Seas

[57] ABSTRACT

Disclosed is a silver halide photographic material containing particular cyanine dye polymer(s) comprising at least one repeating unit represented by formula (I):

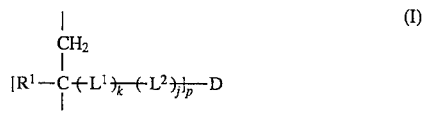

wherein $R^1$ represents a hydrogen atom, an alkyl group having from 1 to 4 carbon atoms, or a chlorine atom; $L^1$ represents —CON($R^2$)— (where $R^2$ represents a hydrogen atom, an alkyl group having from 1 to 4 carbon atoms, or a substituted alkyl group having from 1 to 6 carbon atoms), —COO—, —NHCO—, —OCO—, —$C_6H_2(R^3)(R^4)$COO— (where $R^3$ and $R^4$ each independently represent a hydrogen atom, a hydroxyl group, a halogen atom, or a substituted or unsubstituted alkyl group, a substituted or unsubstituted alkoxy group, a substituted or unsubstituted acyloxy group or a substituted or unsubstituted aryloxy group; and $C_6H_2$ represents a benzene ring with four substituents), or —$C_6H_2(R^3)(R^4)$CON($R^2$)— (where $R^2$, $R^3$, $R^4$ and $C_6H_2$ have the same meanings as above); $L^2$ represents a linking group by which $L^1$ and D are bonded to each other; k and j each represent 0 or 1; p represents 1 or 2; and D represents a cyanine dye residue. The material is successfully detected by an infrared sensor provided in a processing system, while being processed rapidly, and the processed material is free from residual color.

11 Claims, No Drawings

SILVER HALIDE PHOTOGRAPHIC MATERIAL

FIELD OF THE INVENTION

The present invention relates to a silver halide photographic material and, in particular, to a technique for attaining the easy detection of the position of a black-and-white silver halide photographic material when the material is processed with an automatic developing machine.

BACKGROUND OF THE INVENTION

Recently, the needs of rapidly processing photographic materials are being great. In particular, systems of completely processing photographic materials exposed to X-rays within a period of 30 seconds have become popularized. In addition, the needs of reducing the amounts of the replenishers to be added to photographic processing systems are also being great. Accordingly, the tendency toward the reduction in the amount of silver to be coated on photographic materials is now the mainstream in this technical field. However, when such photographic materials having reduced silver coated thereon are processed with an automatic developing machine, the light-shieldability of infrared sensors set in the conveying system including the machine is lowered so that the detection of the position of the photographic material being processed often becomes impossible thereby causing a mechanical failure in conveying the material being processed.

In JP-A-62-299959 (the term "JP-A" as used herein means an "unexamined published Japanese patent application"), disclosed is a method of adding an infrared-absorbing dye of a certain kind to a photographic material so as to overcome the mechanical failure in detecting the photographic material being processed. However, this method has various problems in that it needs the adsorption of the dye onto silver halide grains of a photographic material, that the dye adsorbed onto the grains brings about an additional load in the steps of processing the photographic material (especially in the fixation step), and that the coating of photographic emulsions on a support to prepare the photographic material is complicated. In addition, since the dye itself absorbs visible rays, it causes another problem with a black-and-white photographic material that gives a silver image to be viewed. In JP-A-63-131135, disclosed is a method of utilizing light-scattering grains such as silver halide grains in a photographic material so as to overcome the mechanical failure in detecting the photographic material being processed. However, since this method merely utilizes the refractive index of the photographic material containing the grains, it also has various problems in that the light-shielding effect of the material for sensors is insufficient and that, when the light-scattering grains are silver halide grains, they cause an additional load in the fixation of the photographic material. For these reasons, therefore, this method is not applicable to the technique of reducing the amounts of replenishers in rapid processing of photographic materials.

In JP-A-3-226736, disclosed is a method of adding dyes to photographic materials. However, this method is not satisfactory, since the photographic materials rapidly processed have inevitable residual color.

In JP-A-2-113239, JP-A-3-37271, JP-A-5-323550 and U.S. Pat. No. 2,639,282, disclosed are cyanine dye polymers to be added to photographic materials. However, these polymers are still unsatisfactory in that they are not photochemically inactive and that they cause residual color in the processed photographic materials containing them.

SUMMARY OF THE INVENTION

The object of the present invention is to provide a silver halide photographic material having reduced silver coated thereon, which can be rapidly processed in a processing system to which are added reduced amounts of replenishers. Specifically, the photographic material is designed in such a way that it is successfully detected by a film detecting device provided in a processing system, while being processed rapidly; whilst the photographic properties of the thus-designed material are not worsened.

The above-mentioned object of the present invention has been attained by a silver halide photographic material having hydrophilic colloid layer(s) containing a dye polymer comprising at least one repeating unit represented by formula (I):

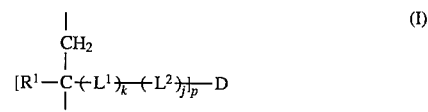

wherein $R^1$ represents a hydrogen atom, an alkyl group having from 1 to 4 carbon atoms, or a chlorine atom;

$L^1$ represents —$CON(R^2)$— (where $R^2$ represents a hydrogen atom, an alkyl group having from 1 to 4 carbon atoms, or a substituted alkyl group having from 1 to 6 carbon atoms), —COO—, —NHCO—, —OCO—, —$C_6H_2(R^3)(R^4)COO$— (where $R^3$ and $R^4$ each independently represent a hydrogen atom, a hydroxyl group, a halogen atom, or a substituted or unsubstituted alkyl group, a substituted or unsubstituted alkoxy group, a substituted or unsubstituted acyloxy group or a substituted or unsubstituted aryloxy group; and $C_6H_2$ represents a benzene ring with four substituents), or —$C_6H_2(R^3)(R^4)CON(R^2)$— (where $R^2$, $R^3$, $R^4$ and $C_6H_2$ have the same meanings as above);

$L^2$ represents a linking group by which $L^1$ and D are bonded to each other;

k and j each represent 0 or 1;

p represents 1 or 2; and

D represents a cyanine dye residue.

DETAILED DESCRIPTION OF THE INVENTION

Preferably, the silver halide photographic material of the present invention is to form black-and-white images, having from 0.5 g/m² to 5 g/m² of silver coated. Also preferably, at least one hydrophilic colloid layer containing a dye polymer comprising at least one repeating unit represented by formula (I) is formed on a transparent support to produce the silver halide photographic material of the present invention. One preferred embodiment of the present invention is a method of detecting the position of the silver halide photographic material by irradiating a ray having a wavelength which is longer than the wavelength at the peak of the spectral sensitivity of the material by 50 nm or more and is 750 nm or longer to the material, thereby detecting the ray blocked off or not blocked off by the material.

The repeating unit represented by formula (I) will be described in detail hereunder.

The dye polymer to be used in the present invention is derived from one or more dye monomers represented by formula (II) by polymerization.

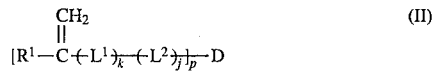

wherein $R^1$, $L^1$, $L^2$, k, j, p and D have the same meanings as those in formula (I).

The linking group of $L^2$ is concretely represented by $-(X^1-(J^1-X^2)_r-(J^2-X^3)_q-(J^2)_s)-$.

$J^1$, $J^2$ and $J^3$ may be the same or different, including $-CO-$, $-SO_2-$, $-CON(R^5)-$ (where $R^5$ represents a hydrogen atom, an alkyl group having from 1 to 6 carbon atoms, or a substituted alkyl group having from 1 to 6 carbon atoms), $-SO_2N(R^5)-$ (where $R^5$ has the same meaning as above), $-N(R^5)R^6-$ (where $R^5$ has the same meaning as above; and $R^6$ represents an alkylene group having from 1 to 4 carbon atoms), $-N(R^5)R^6-N(R^7)-$ (where $R^5$ and $R^6$ have the same meanings as above; and $R^7$ represents a hydrogen atom, an alkyl group having from 1 to 6 carbon atoms, or a substituted alkyl group having from 1 to 6 carbon atoms), $-O-$, $-S-$, $-N(R^5)CO-N(R^7)-$ (where $R^5$ and $R^7$ have the same meanings as above), $-N(R^5)SO_2-N(R^7)-$ (where $R^5$ and $R^7$ have the same meanings as above), $-COO-$, $-OCO-$, $-N(R^5)CO_2-$ (where $R^5$ has the same meaning as above), $-N(R^5)CO-$ (where $R^5$ has the same meaning as above), etc.

q, r and s each represent 0 or 1.

$X^1$, $X^2$ and $X^3$ may be the same or different and each represents an unsubstituted or substituted alkylene group having from 1 to 10 carbon atoms, an unsubstituted or substituted aralkylene group having from 7 to 10 carbon atoms or an unsubstituted or substituted phenylene group having 6 or 10 carbon atoms, in which the alkylene moiety may be linear or branched. The alkylene group includes, for example, methylene, methylmethylene, dimethylmethylene, dimethylene, trimethylene, tetramethylene, pentamethylene, hexamethylene and decylmethylene groups. The aralkylene group includes, for example, benzylidene group. The substituted or unsubstituted phenylene group includes, for example, p-phenylene, m-phenylene, 2-methyl-1,4-phenylene groups.

As examples of the substituents for the substituted alkylene, aralkylene and phenylene groups of $X^1$, $X^2$ and $X^3$, mentioned are a halogen atom, a nitro group, a cyano group, an alkyl group, a substituted alkyl group, an alkoxy group, a substituted alkoxy group, a group of $-NHCOR^8$ (where $R^8$ represents an alkyl group, a substituted alkyl group, a phenyl group, a substituted phenyl group, an aralkyl group, or a substituted aralkyl group), $-NHSO_2R^8$ (where $R^8$ has the same meaning as above), $-SOR^8$ (where $R^8$ has the same meaning as above), $-SO_2R^8$ (where $R^8$ has the same meaning as above), $-COR^8$ (where $R^8$ has the same meaning as above), $-CONR^9R^{10}$ (where $R^9$ and $R^{10}$ may be the same or different and each represents a hydrogen atom, an alkyl group, a substituted alkyl group, a phenyl group, a substituted phenyl group, an aralkyl group, or a substituted aralkyl group), $-SO_2NR^9R^{10}$ (where $R^9$ and $R^{10}$ have the same meanings as above), an amino group (optionally substituted by alkyl group(s)), a hydroxyl group, and a group which is hydrolyzed to form a hydroxyl group. Where $X^1$, $X^2$ and $X^3$ each have two or more substituents, the plural substituents may be the same or different.

As examples of the substituents for the above-mentioned substituted alkyl group, substituted alkoxy group, substituted phenyl group and substituted aralkyl group, mentioned are a hydroxyl group, a nitro group, an alkoxy group having from 1 to about 4 carbon atoms, $-NHSO_2R^8$ (where $R^8$ has the same meaning as above), $-NHCOR^8$ (where $R^8$ has the same meaning as above), $-SO_2NR^9R^{10}$ (where $R^9$ and $R^{10}$ have the same meanings as above), $-CONR^9R^{10}$ (where $R^9$ and $R^{10}$ have the same meanings as above), $-SO_2R^8$ (where $R^8$ has the same meaning as above), $-COR^8$ (where $R^8$ has the same meaning as above), a halogen atom, a cyano group, an amino group (optionally substituted by alkyl group(s)), etc.

Especially preferred cyanine dyes for the cyanine dye residue of D are those represented by formula (III):

wherein $B_1$ and $B_2$ each represent a basic nucleus; $L_1$, $L_2$ and $L_3$ each represent a methine group; and m represents 2, 3 or 4.

As examples of the basic nuclei of $B_1$ and $B_2$, mentioned are pyridine, quinoline, indolenine, benzindolenine, oxazole, imidazole, thiazole, benzoxazole, benzimidazole, benzothiazole, oxazoline, naphthoxazole, pyrrole and benzisoxazole nuclei, which may optionally have substituent(s). Especially preferred are indolenine, benzindolenine, benzothiazole, benzoxazole and quinoline nuclei.

The methine groups of $L_1$, $L_2$ and $L_3$ may have substituent(s). The substituents, if any, on the methine groups may be bonded to each other to form a 5-membered or 6-membered ring (for example, a substituted or unsubstituted cyclopentene group, or a substituted or unsubstituted cyclohexene group).

As examples of the substituents for the above-mentioned groups, mentioned are a carboxylic acid group, a sulfonic acid group, a sulfonamido group having from 1 to 10 carbon atoms (e.g., methanesulfonamido, benzenesulfonamido, butanesulfonamido, n-octanesulfonamido), a sulfamoyl group having from 0 to 10 carbon atoms (e.g., unsubstituted sulfamoyl, methylsulfamoyl, phenylsulfamoyl, butylsulfamoyl), a sulfonylcarbamoyl group having from 2 to 10 carbon atoms (e.g., methanesulfonylcarbamoyl, propanesulfonylcarbamoyl, benzenesulfonylcarbamoyl), an acylsulfamoyl group having from 1 to 10 carbon atoms (e.g., acetylsulfamoyl, propionylsulfamoyl, pivaloylsulfamoyl, benzoylsulfamoyl), an acyclic or cyclic alkyl group having from 1 to 8 carbon atoms (e.g., methyl, ethyl, isopropyl, butyl, hexyl, cyclopropyl, cyclopentyl, cyclohexyl, 2-hydroxyethyl, 2-sulfoethyl, 4-sulfobutyl, 4-carboxybutyl, 2-methoxyethyl, benzyl, phenethyl, 2-sulfobenzyl, 4-carboxybenzyl, 2-diethylaminoethyl), an alkenyl group having from 2 to 8 carbon atoms (e.g., vinyl, allyl), an alkoxy group having from 1 to 8 carbon atoms (e.g., methoxy, ethoxy, butoxy), a halogen atom (e.g., F, Cl, Br), an amino group having from 0 to 10 carbon atoms (e.g., unsubstituted amino, dimethylamino, diethylamino, carboxyethylamino), an ester group having from 2 to 10 carbon atoms (e.g., methoxycarbonyl), an amido group having from 1 to 10 carbon atoms (e.g., acetylamino, benzamido), a carbamoyl group having from 1 to 10 carbon atoms (e.g., unsubstituted carbamoyl, methylcarbamoyl, ethylcarbamoyl), an aryl group having from 6 to 10 carbon atoms (e.g., phenyl, naphthyl, 4-carboxyphenyl, 3-carboxyphenyl, 3,5-dicarboxyphenyl, 4-sulfophenyl, 2-sulfophenyl, 2,5-disulfophenyl, 4-methanesulfonamidophenyl, 4-butanesulfonamidophenyl), an aryloxy group having from 6 to 10 carbon atoms (e.g., phenoxy, 4-carboxyphenoxy, 3-methylphenoxy, naphthoxy), an alkylthio group having from 1 to 8 carbon atoms (e.g., methylthio, ethylthio, octylthio), an arylthio group having from 6 to 10 carbon atoms (e.g., phenylthio, naphthylthio), an acyl group having from 1 to 10 carbon atoms (e.g., acetyl, benzoyl, propanoyl), a sulfonyl group having from 1 to 10 carbon atoms (e.g., methanesulfonyl, benzenesulfonyl), an ureido group having from 1 to 10 carbon atoms (e.g., ureido, methylureido), an urethane group having from 2 to 10 carbon atoms (e.g., methoxycarbonylamino, ethoxycarbonylamino), a cyano group, a hydroxyl group, a nitro group, a heterocyclic group (e.g., 5-carboxybenzoxazole, pyridine, sulforan, furan, pyrrole, pyrrolidine, morpholine, piperazine, pyrimidine), etc.

Specific examples of dye monomers employable in the present invention are mentioned below, which, however, are not limitative.

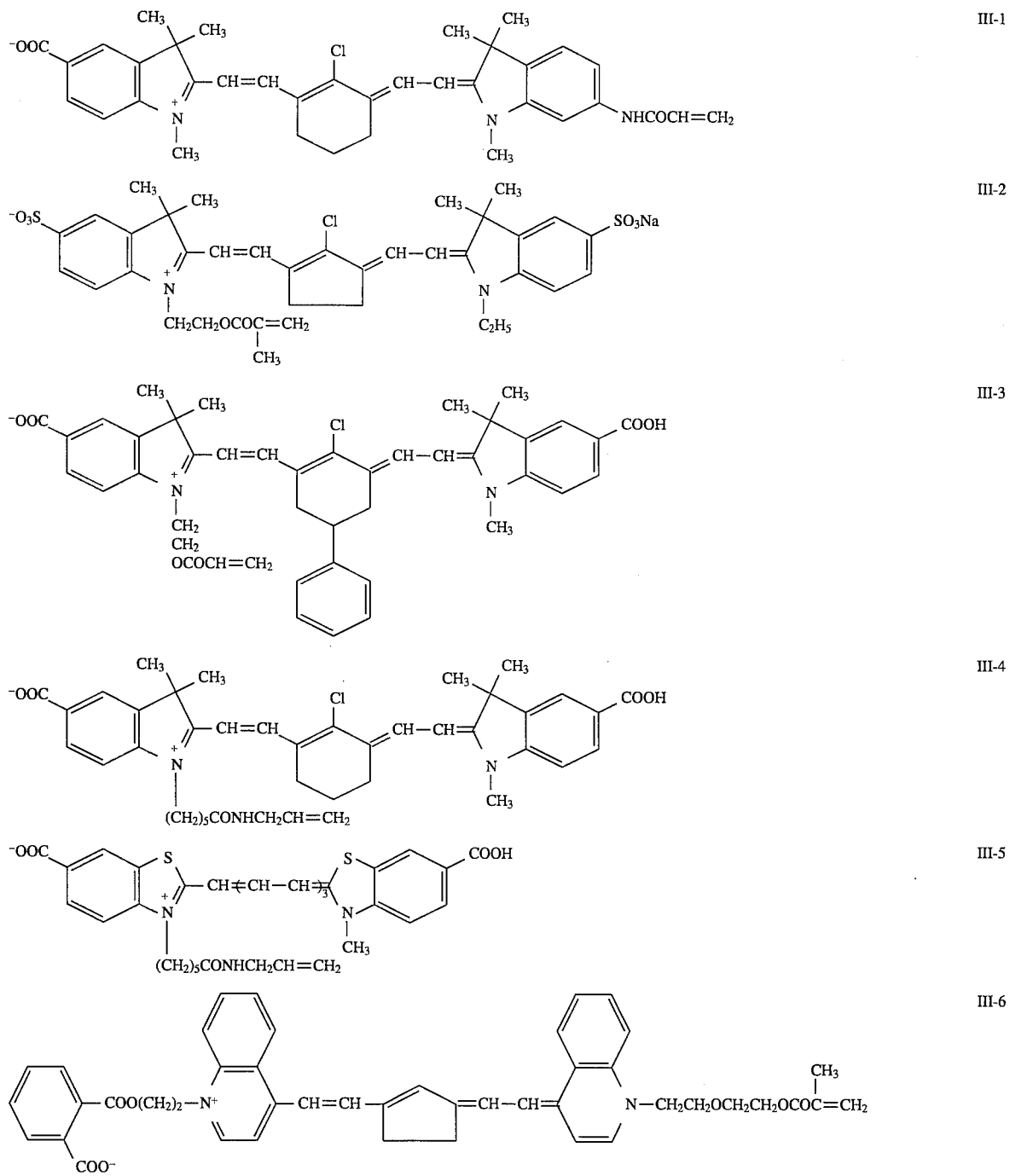

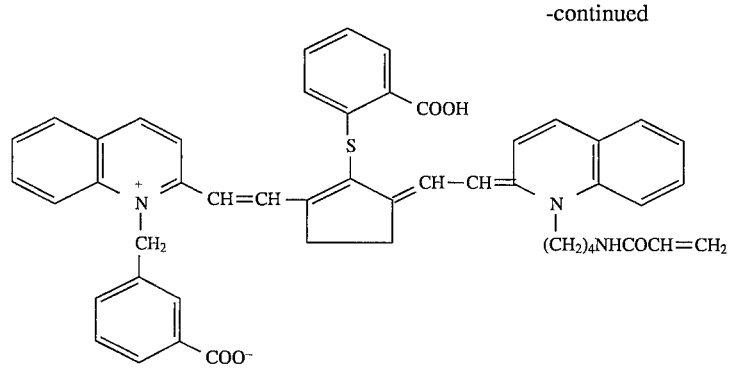
III-7
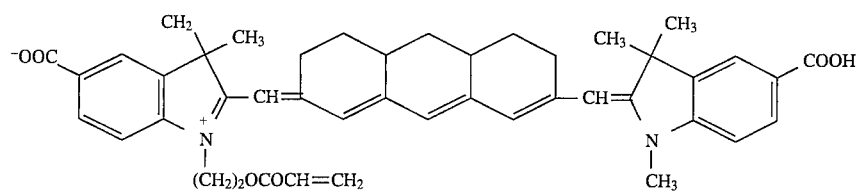
III-8
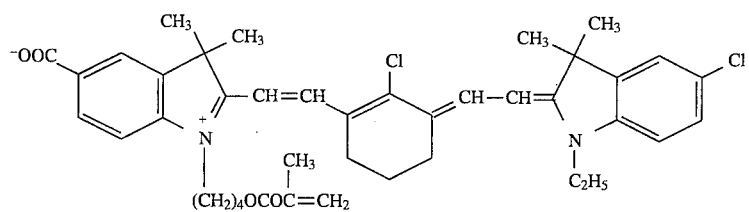
III-9
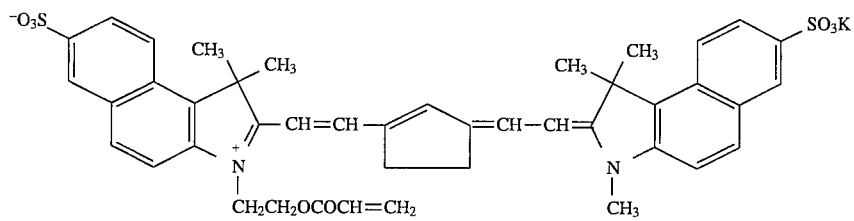
III-10
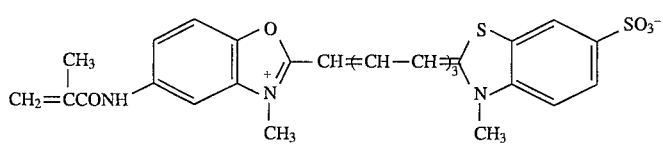
III-11
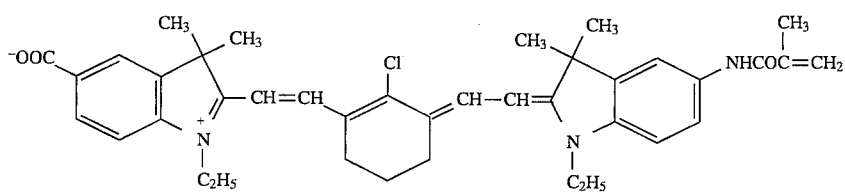
III-12
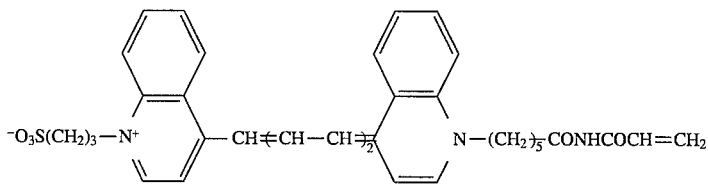
III-13

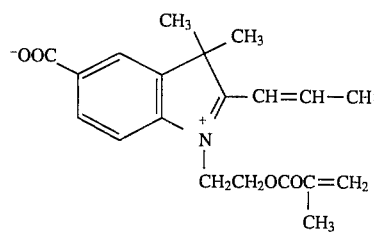 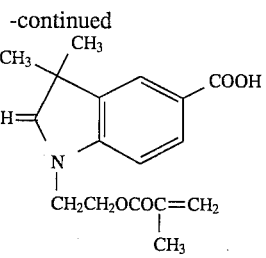

III-14

The dye polymer for use in the present invention may be of a copolymer comprising ethylenic unsaturated monomer(s) not containing any cyanine dye residue. As preferred examples of such monomers, mentioned are acrylic acid, α-chloroacrylic acid, α-alkylacrylic acids (e.g., methacrylic acid), esters and amides to be derived from such acrylic acids (e.g., acrylamide, methacrylamide, 6-acrylamidohexanoic acid, 4-hydroxyphenylacrylamide, t-butylacrylamide, 2-acrylamido-2-mehtylpropanesulfonic acid, methyl acrylate, methyl methacrylate, ethyl acrylate, n-propyl acrylate, 2-(3-carboxypropionyloxy)ethyl methacrylate, iso-propyl acrylate, n-butyl acrylate, t-butyl acrylate, n-butyl methacrylate, 2-ethylhexyl acrylate, n-hexyl acrylate, n-octyl acrylate, lauryl acrylate, acetacetoxyethyl methacrylate, ethylene glycol dimethacrylate, glycidyl methacrylate, methylenebisacrylamide), vinyl esters (e.g., vinyl acetate, vinyl propionate, vinyl laurate), acrylonitrile, methacrylonitrile, aromatic vinyl compounds (e.g., styrene and its derivatives (such as potassium styrenesulfinate, 4-vinylbenzoic acid, sodium styrenesulfonate, etc.) vinyltoluene, divinylbenzene, vinylacetophenone), vinylidene chloride, vinyl alkyl ethers (e.g., vinyl ethyl ether), maleates, N-vinyl- 2-pyrrolidone, N-vinylpyridine, 2- and 4-vinylpyridines, etc. Especially preferred are acrylates, methacrylates, acrylamides, methacrylamides, styrene and its derivatives. If desired, combinations of two or more monomers, for example, n-butyl acrylate and methyl acrylate, n-butyl acrylate and styrene, methyl acrylate and t-butylacrylamide, or ethyl acrylate and methacrylic acid, can be employed.

The dye polymer comprising at least one repeating unit represented by formula (I) for use in the present invention may be of a so-called latex of its aqueous dispersion that has been stabilized against the coagulation of the polymer molecules due to the repulsive force of the charges based on the ionic groups of itself or the charges of the surfactant existing in the latex.

One example of producing the dye latex for use in the present invention will be described below.

The dye latex for use in the present invention can be prepared by well-known emulsion polymerization. For instance, monomers for the dye polymer are emulsified in water or in a mixed solvent comprising water and water-miscible organic solvent(s) (e.g., methanol, ethanol, acetone, etc.), in the presence of at least one emulsifying agent, and polymerized therein in the presence of a radical polymerization initiator generally at 30° C. to about 100° C., preferably at 40° C. to about 90° C. The amount of the water-miscible organic solvent(s) may be from 0 to 100% by volume, preferably from 0 to 50% by volume, relative to water.

The polymerization of the monomers is conducted generally in the presence of from 0.05 to 5% by weight, relative to the monomers to be polymerized, of a radical polymerization initiator and optionally (i.e., in case of an emulsion polymerization) from 0.1 to 10% by weight, relative to the same, of an emulsifying agent. As the polymerization initiator, employable are azobis compounds, peroxides, hydroperoxides, redox catalysts, etc., for example, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, 2,2'-azobisisobutyrate, 2,2'-azobis(2-amidinopropane) hydrochloride, 2,2'-azobis-2-cyanopentanoic acid and its salts, etc.

As the emulsifying agent, employable are anionic, cationic, ampholytic and nonionic surfactants as well as water-soluble polymers. These include, for example, sodium laurate, sodium dodecylsulfate, sodium 1-octoxycarbonylmethyl- 1-octoxycarbonylmethanesulfonate, sodium laurylnaphthalenesulfonate, sodium laurylbenzenesulfonate, sodium laurylphosphate, cetyltrimethylammonium chloride, dodecyltrimethylammonium chloride, N-2-ethylhexylpyridinium chloride, polyoxyethylene-nonylphenylether, polyoxyethylene-sorbitan lauryl ester, polyvinyl alcohol, and the emulsifying agents and water-soluble polymers described in JP-B-53-6190 (the term "JP-B" as used herein means an "examined Japanese patent publication").

Needless-to-say, the polymerization initiator to be used, the concentration of the monomers to be polymerized, the polymerization temperature and the reaction time for the emulsion polymerization to prepare the dye polymers for use in the present invention can be varied broadly with ease according to the object.

To conduct the emulsion polymerization, all the necessary dye monomers, monomers except dye monomers, surfactants and media may be previously put in a polymerization reactor and an initiator is added thereto to start the reaction. Alternatively, parts or all of these components may be dropwise added to the reaction system, while conducting the polymerization.

The dye polymer for use in the present invention may also be obtained by bonding cyanine dyes to the main chain of a polymer by covalent bond, via any of their atoms capable of forming covalent bond between the dye and the main chain of the polymer. For instance, the covalent bond between the dye and the main chain of a polymer may be formed via a hetero atom, such as nitrogen atom, in the heterocyclic nucleus of the dye. The means of bonding dye molecules to the main chain of a polymer is on the technical level in this technical field (for example, refer to JP-A-3-37217, JP-A-2-113239, U.S. Pat. No. 2,639,282). For instance, dyes are bonded to the main chain of a polymer by substitution reaction (using, for example, a nucleophilic agent having an amino, hydroxyl, alkoxy or alkylthio group), addition reaction (for example, Michel addition of an active unsaturated group, such as vinylsulfonyl or acryloyl group, to an active methylene group, such as —CO—$CH_2$—CO—$CH_3$ or —CO—$CH_2$—CN) or condensation reaction (for example, reaction of amines or alcohols and carboxylic acids or their esters). These reactions may be between hydroxyl compounds or amines and isocyanates, carboxylic acids, carboxylates, carboxylic acid halides, carboxylic acid anhydrides, sulfonic acids, sulfonates or sulfonic acid halides.

The bonding of dyes to the main chain of a polymer may be such that dyes are bonded to the main chain of a polymer directly or via a known functional group having a divalent hydrocarbon group with from 4 to 15 carbon atoms, such as an ester group (e.g., —$(CH_2)_2$—$CO_2$—$(CH_2)_2$—), an amido group (e.g., —$(CH_2)_2$—CO—NH—$(CH_2)_2$—), an imido group (e.g., —$(CH_2)_4$—NH—CO—$(CH_2)_4$—), an urethane group (e.g., —$(CH_2)_3$—O—CO—NH—$(CH_2)_3$—), a sulfonamido group (e.g., —$(CH_2)_3$—$SO_2$—NH—$(CH_2)_3$—), or a carbonato group (e.g., —$(CH_2)_2$—O—CO—O—$(CH_2)_4$—).

As one preferred example of the main chain of a polymer, mentioned is a polyallylamine. This polymer is advantageous in that its industrial production is easy, that the introduction of various functional groups such as dye residues thereinto is easy since it has amino groups to which dyes can be bonded, and that the amino groups in this polymer make the polymer hydrophilic thereby improving the miscibility of the polymer with silver halide emulsions. In addition, since the polymer is easily soluble in polar solvents, such as water, methanol, etc., under acidic conditions, its addition to hydrophilic colloid layers is easy.

Compositions of dye polymers employable in the present invention are mentioned below, which, however, are not intended to restrict the scope of the present invention. The ratio parenthesized indicates percentages by weight of the constitutive components.

P-1: III-1/butyl acrylate copolymer (30/70)
P-2: III-2/butyl acrylate copolymer (30/70)
P-3: III-2/butyl acrylate/6-acrylamidohexanoic acid copolymer (40/30/30)
P-4: III-3/butyl acrylate copolymer (40/60)
P-5: Homopolymer of III-3 (100)
P-6: III-3/methyl acrylate/divinylbenzene copolymer (30/60/10)
P-7: III-9/butyl acrylate copolymer (30/70)
P-8: III-10/butyl acrylate copolymer (30/70)
P-9: III-12/butyl acrylate copolymer (30/70)
P-10: III-12/butyl acrylate/ethylene glycol dimethacrylate copolymer (30/60/10)
P-11: III-1/methyl acrylate/methacrylic acid/sodium 2-sulfoethylmethacrylate copolymer (10/80/5/5)

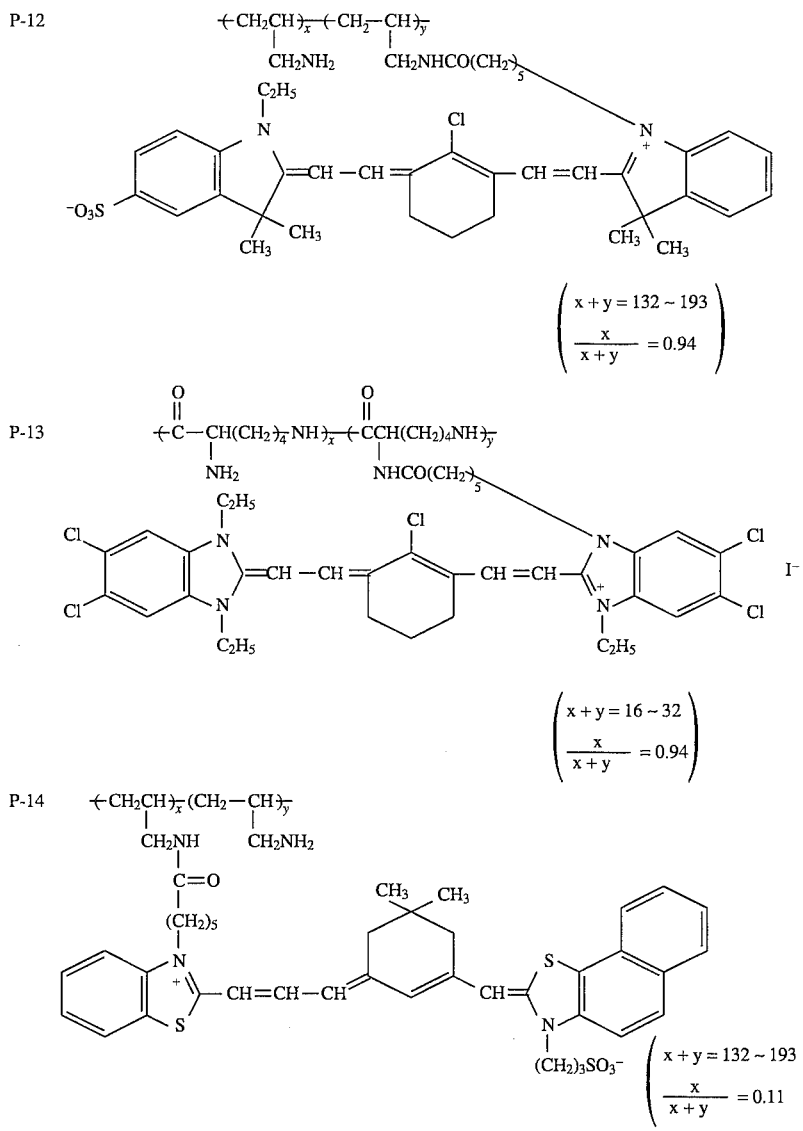

Examples of producing dye polymers for use in the present invention are mentioned below.

SYNTHESIS EXAMPLE 1

Synthesis of Dye Polymer P-12

15 ml of dimethylsulfoxide and 8.3 g of 1-[5 -(p-nitrophenyloxycarbonyl)]-pentyl-2,3,3-trimethylindolenium iodide were mixed, and the resulting mixture was added to a liquid mixture comprising 1 g of polyallylamine hydrochloride having a mean molecular weight of from 7500 to 11000, 3 ml of triethylamine and 10 ml of dimethylsulfoxide. These were stirred at 60° C. for 4 hours, and 8.6 g of 2-[2-(3-acetanilidomethylidene-2-chlorocyclohexen-1-yl)vinyl]-1-ethyl-3,3-dimethyl-5-sulfonatoindolenium were added thereto. 2 ml of tetramethylguanidine were added to the resulting solution and stirred at 20° C. for 3 hours. Then, the reaction mixture was poured into 500 ml of isopropanol at 20° C. The precipitate thus formed was taken out by filtration and dried to obtain 5.9 g of dye polymer P-12.

The absorbance of the solution of this polymer in dimethylsulfoxide was 38% of that of the solution of the the same weight of the following comparative dye A in the same.

Comparative Dye A:

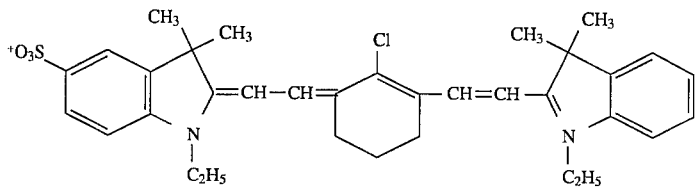

SYNTHESIS EXAMPLE 2

Synthesis of Dye Polymer P-1

1.5 g of sodium dodecylsulfate, 300 ml of distilled water and 50 ml of methanol were put into a one-liter three-neck flask equipped with a stirrer and a reflux condenser tube and stirred under heat at 65° C. in a nitrogen stream. A solution prepared by dissolving 1.0 g of sodium 2,2'-azobis-2-cyanopentanoate in 50 ml of distilled water was added thereto, and a liquid mixture comprising 15 g of dye monomer III-1, 35 g of butyl acrylate and 100 ml of methanol was dropwise added thereto over a period of 2 hours.

After the addition, the resulting mixture was stirred for further 1 hour at 65° C., and the external temperature around the reaction system was elevated up to 90° C. with still stirring in a nitrogen stream. The methanol distilled out with the heating was removed from the reaction system through a Dean-Stark tube. After further heated for 3 hours at 90° C., this was cooled and filtered to obtain 378 g of the entitled dye polymer P-1 as its latex.

A part of this latex was concentrated to dryness, and the resulting solid was subjected to elementary analysis, which revealed that the dye polymer contained $4.43 \times 10^{-4}$ mol of dye monomer III-1 per gram of the resulting solid. The solid content of P-1 in the latex was 13.4% by weight, and the mean grain size of the particles of P-1 was 110 nm (as measured with a coal tar submicron grain analyzer produced by Nikka Kikai KK).

It is desired that the proportion of the dye moiety in the dye polymer for use in the present invention is generally from 5 to 100% by weight, but especially preferably from 20 to 80% by weight in view of the color hue of the dye polymer itself and the thickness of the film containing the dye polymer. In this case, the equivalent molecular weight of the dye polymer (to be represented by the number of grams of the dye polymer containing one mol of the dye monomer therein) is approximately from about 25 to about 4000, which, however, is not limitative.

The proportion of the other monomers than the dye monomer in the dye polymer may be varied, depending on the the structure of the dye moiety in the polymer. Preferably, it may be from 0 to 95% by weight, more preferably from 20 to 80% by weight.

The amount of the dye polymer to be added to the photographic material of the present invention may be from $10^{-3}$ g/m$^2$ to 4 g/m$^2$, preferably from $5 \times 10^{-3}$ g/m$^2$ to 2 g/m$^2$.

The photographic material of the present invention contains the particular dye polymer mentioned above in its hydrophilic colloid layer, which therefore has an absorption peak at a wavelength falling between 750 nm and 1200 nm.

The dye polymer for use in the present invention may be mixed with various organic compounds that are used for preparing photographic materials, such as gelatin, synthetic polymers (e.g., polyvinyl alcohol, polyacrylamide), saccharides, etc., to form photographic layers.

The dye polymer may be added to various photographic layers. For instance, it may be added to silver halide emulsion layers, anti-halation layers to be provided between a support and silver halide emulsion layers, subbing layers for a support, protective layers to be provided over silver halide emulsion layers, interlayers, backing layers to be provided on the back surface of a support opposite to the front surface thereof to be coated with silver halide emulsion layers.

In the photographic material of the present invention, the layer containing the particular dye polymer mentioned above may contain known photographic additives, such as hardening agent, surfactant, organic or inorganic matting agent, lubricant agent, polymer latex, water-soluble or dispersed dye, development accelerator, development inhibitor, antistatic agent (e.g,. metal oxides, charged polymers), etc.

Additives, etc. to be added or applied to the photographic material of the present invention are not specifically defined. For instance, those mentioned below may be employed.

| Items | References |
|---|---|
| 1) Silver halide emulsions and methods of preparing them | JP-A-2-68539, from page 8, right lower column, line 6 from the bottom to page 10, right upper column, line 12; JP-A-3-24537, from page 2, right lower column, line 10 to page 6, right upper column, line 1; ibid., from page 10, left upper column, line 16 to page 11, left lower column, |

| Items | References |
|---|---|
| | line 19;<br>JP-A-4-107442;<br>JP-A-2-97937, from page 20, right lower column, line 12 to page 21, left lower column, line 14;<br>JP-A-2-12236, from page 7, right upper column, line 19 to page 8, left lower column, line 12;<br>JP-A-4-330430 |
| 2) Chemical Sensitization | JP-A-2-68539, page 10, from right upper column, line 13 to left upper column, line 16;<br>JP-A-5-313282 |
| 3) Antifoggants, Stabilizers | JP-A-2-68539, from page 10, left lower column, line 17 to page 11, left upper column, line 7, from page 3, left lower column, line 2 to page 4, left lower column, line 20;<br>JP-A-2-103526, from page 17, right lower column, line 19 to page 18, right upper column, line 4, page 18, right lower column, lines 1 to 5;<br>thiosulfinic acid compounds described in JP-A-1-237538 |
| 4) Color Tone Improving Agents | JP-A-62-276539, from page 2, left lower column, line 7 to page 10, left lower column, line 20;<br>JP-A-3-94249, from page 6, left lower column, line 15 to page 11, right upper column, line 19 |
| 5) Spectral Sensitizing Dyes | JP-A-2-68539, from page 4, right lower column, line 4 to page 8, right lower column, line 8 from the bottom;<br>JP-A-2-55349, from page 7, left upper column, line 8 to page 8, right lower column, line 8;<br>JP-A-2-39042, from page 7, right lower column, line 8 to page 13, right lower column, line 5;<br>JP-A-2-12236, page 8, from left lower column, line 13 to right lower column, line 4;<br>JP-A-2-103536, from page 16, right lower column, line 3 to page 17, left lower column, line 20;<br>spectral sensitizing dyes described in JP-A-1-112235, JP-A-2-124560, JP-A-3-7928;<br>JP-A-5-11389 |
| 6) Surfactants Antistatic Agents | JP-A-2-68539, from page 11, left upper column, line 14 to page 12, left upper column, line 9;<br>JP-A-2-12236, page 9, from right upper column, line 7 to right lower column, line 7;<br>JP-A-2-18542, from page 2, left lower column, line 13 to page 4, right lower column, line 18 |
| 7) Matting Agents, Lubricants, Plasticizers | JP-A-2-68539, page 12, from left upper column, line 10 to right upper column, line 10, page 14, from left lower column, line 10 to right lower column, line 1;<br>JP-A-2-103526, page 19, from left upper column, line 15 to right upper column, line 15 |
| 8) Hydrophilic Colloids | JP-A-2-68539, page 12, from right upper column, line 11 to left lower column, line 16 |
| 9) Hardening Agents | JP-A-2-68539, from page 12, left lower column, line 17 to page 13, right upper column, line 6;<br>JP-A-2-103526, page 18, right upper column, lines 5 to 17 |
| 10) Binders | JP-A-2-18542, page 3, right lower column, lines 1 to 20 |
| 11) Polyhydroxy-benzenes | JP-A-3-39948, from page 11, left upper column, line 1 to page 12, left lower column, line 12;<br>EP-A-452772; |
| | JP-A-2-55349, page 11, from left upper column, line 9 to right lower column, line 17 |
| 12) Polymer Latexes | JP-A-2-103526, page 18, left lower column, lines 12 to 20 |
| 13) Compounds Having Acid Group(s) | JP-A-2-103526, from page 18, right lower column, line 6 to page 19, left upper column, line 1;<br>JP-A-2-55349, from page 8, right lower column, line 13 to page 11, left upper column, line 8 |
| 14) Hydrazine Nucleating Agents | JP-A-2-12236, from page 2, right upper column, line 19 to page 7, left upper column, line 3;<br>Compounds represented by formula (II) and Compounds II-1 to II-54 described in JP-A-3-174143, from page 20, right lower column, line 1 to page 27, right upper column, line 20 |
| 15) Nucleation Accelerators | Compounds represented by formulae (II-m) to (II-p) and Compounds II-1 to II-22 described in JP-A-2-103536, from page 9, right upper column, line 13 to page 16, left upper column, line 10;<br>Compounds described in JP-A-1-179939 |
| 16) Black Pepper Inhibitors | U. S. Pat. No. 4,956,257;<br>JP-A-1-118832 |
| 17) Redox Compounds | Compounds represented by formula (I) (especially, compounds Nos. 1 to 50) described in JP-A-2-301743;<br>Compounds represented by formulae (R-1), (R-2), (R-3) and Compounds Nos. 1 to 75 described in JP-A-3-174143, pp. 3 to 20;<br>Compounds described in JP-A-5-257239 and JP-A-4-278939 |
| 18) Monomethine Compounds | Compounds represented by formula (II) (especially, compounds II-1 to II-26) described in JP-A-2-287532 |
| 19) Layer Constitution | JP-A-3-198041 |
| 20) Development | JP-A-2-103037, from page 16, right upper column, line 7 to page 19, left lower column, line 15;<br>JP-A-2-115837, from page 3, right lower column, line 5 to page 6, right upper column, line 10<br>JP-A-2-55349, from page 13, right lower column, line 1 to page 16, left upper column, line 10 |

The present invention will be described in more detail by means of the following examples, which, however, are not intended to restrict the scope of the present invention.

EXAMPLE 1

Preparation of Coating Solution for Emulsion Layer:

5 g of potassium bromide, 0.05 g of potassium iodide, 30 g of gelatin and 2.5 ml of an aqueous 5% solution of thioether $HO(CH_2)_2S(CH_2)_2S(CH_2)_2OH$ were added to 1 liter of water. The resulting solution was kept at 73° C., to which added were 45 ml of an aqueous solution containing 8.33 g of silver nitrate and 45 ml of an aqueous solution containing 5.94 g of potassium bromide and 0.726 g of potassium iodide by a double jet method, while stirring, over a period of 45 seconds. Next, 2.5 g of potassium bromide were added thereto, and then 45 ml of an aqueous solution containing 8.33 g of silver nitrate was added thereto over a period of 7 minutes and 30 seconds while the flow rate of the solution being added was accelerated in such a way that the flow rate at the end of the addition might be two times the flow rate at the start of the addition. Next, 830 ml of an aqueous solution containing 153.34 g of silver nitrate and 850 ml of an aqueous solution containing 112.7 g of potassium bromide and 1.5 g of potassium iodide were added by a controlled double jet method over a period of 25 minutes, while the potential of the system was kept at pAg of 8.1 and while the flow rate of the solutions being added was accelerated in such a way that the flow rate at the end of the addition was 8 times the flow rate at the start of the addition. After the addition, 15 ml of a 2N solution of potassium thiocyanate were added to the system, and 50 ml of an aqueous 1% solution of potassium iodide were added thereto over a period of 30 seconds. Next, the temperature of the system was lowered to 35° C., and the soluble salts were removed therefrom by flocculation. This was heated up to 40° C., and 68 g of gelatin, 2 g of phenol and 7.5 g of trimethylolpropane were added thereto. Then, this was adjusted at pH of 6.55 and pAg of 8.10 by adding sodium hydroxide and potassium bromide thereto.

This was heated up to 56° C., and 175 mg of 4-hydroxy-6-methyl-1,3,3a,7-tetrazaindene and 625 mg of a sensitizing dye represented by the following structural formula were added thereto. After 10 minutes, 5.5 mg of sodium thiocyanate 5-hydrate, 163 mg of potassium thiocyanate and 3.6 mg of chloroauric acid were added thereto. After 5 minutes, this was rapidly cooled to be gelled. The thus-obtained emulsion comprised tabular grains having an aspect ratio of 3 or more at a ratio of 93% of the sum of the projected areas of all the grains therein. In the emulsion, all the grains having an aspect ratio of 2 or more had a mean diameter of the projected area of 0.95 μm, a standard deviation of 23%, a mean thickness of 0.155 μm and a mean aspect ratio of 6.1.

Sensitizing Dye:

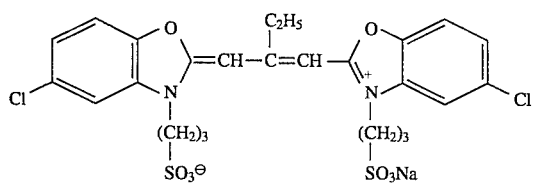

The following chemicals were added to the emulsion to prepare a coating solution. The amounts mentioned below are per mol of the silver halide in the emulsion.

| | |
|---|---|
| 2,6-Bis(hydroxyamino)-4-diethylamino-1,3,5-triazine | 80 mg |
| Sodium Polyacrylate (mean molecular weight, 41,000) | 4.0 g |

 9.7 g

| | |
|---|---|
| Copolymer plasticizer of ethyl acrylate/acrylic acid/methacrylic acid (95/2/3) | 20.0 g |
| Nitron | 50 g |

-continued

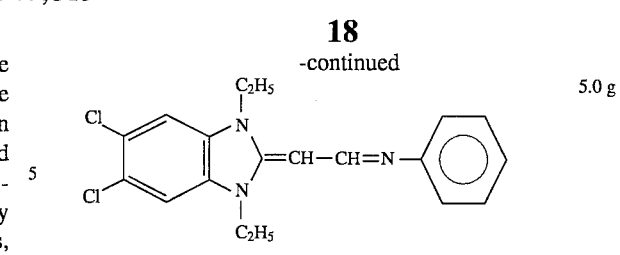 5.0 g

The coating solution thus prepared was coated on the both surfaces of a polyethylene terephthalate film support, along with a coating solution for the surface protective layer, by co-extrusion. The emulsion layer and the surface protective layer formed on one surface of the support are as follows:

| Emulsion Layer: | |
|---|---|
| Silver | 1.5 g/m$^2$ |
| Gelatin | 1.5 g/m$^2$ |
| Surface Protective Layer: | |
| Gelatin | 0.81 g/m$^2$ |
| Dye | See Table 1 |
| Dextran (mean molecular weight: 39,000) | 0.81 g/m$^2$ |
| Matting Agent (mean grain size: 3.5 μm) of copolymer of polymethyl methacrylate/methacrylic acid (9/1) | 0.06 g/m$^2$ |
| $C_8H_{17}-\bigcirc-O(CH_2CH_2O)_{10}(CH_2CHCH_2O)_3H$ $\quad\quad\quad\quad\quad\quad\quad\quad\quad\quad\quad OH$ | 60 mg/m$^2$ |
| $C_8H_{17}-\bigcirc-O(CH_2CH_2O)_2CH_2CH_2SO_2Na$ | 20 mg/m$^2$ |
| $C_8F_{17}SO_2N(CH_2CH_2O)_4(CH_2)SO_3Na$ $\quad\quad\quad\quad C_3H_7$ | 2 mg/m$^2$ |
| $C_8F_{17}SO_2N(CH_2CH_2O)_{15}H$ $\quad\quad\quad\quad C_3H_7$ | 5 mg/m$^2$ |
| 4-Hydroxy-6-methyl-1,3,3a,7-tetrazaindene | 15.5 mg/m$^2$ |
| Sodium Polyacrylate (mean molecular weight: 41,000) | 70 mg/m$^2$ |

A hardening agent of 1,2-bis(sulfonylacetamido)ethane was coated in an amount of 56 mg/m$^2$ per one surface. Thus, a photographic material sample of the invention was prepared.

Evaluation of Residual Color on Processed Sample:

To the both surfaces of the sample prepared above, airtightly attached was Grenex Orthoscreen HR-4 (produced by Fuji Photo Film Co., Ltd.), using a cassette. This was subjected to X-ray sensitometry. The amount of exposure was controlled by varying the distance between the X-ray bulb and the cassette. After the exposure, this was developed with an automatic developing machine, using the following developer and fixer. The Dmin value of the thus-processed sample was measured with the naked eye, from which the residual color, if any, on the sample was evaluated.

A: Not problematic in practical use
B: Problematic in practical use

| Processing: | |
|---|---|
| Development | 35° C. × 9.5 seconds |
| Fixation | 31° C. × 10 seconds |
| Washing | 15° C. × 6 seconds |
| Squeezing | 6 seconds |
| Drying | 50° C. × 12 seconds |
| Dry-to-dry Time | 45 seconds |

-continued

| Amounts of Replenishers: | |
|---|---|
| Developer | 25 ml/8 inch × 10 inch |
| Fixer | 25 ml/8 inch × 10 inch |

The developer and the fixer used above had the following compositions.

| Developer: | |
|---|---|
| Potassium Hydroxide | 29 g |
| Potassium Sulfite | 44.2 g |
| Sodium Hydrogencarbonate | 7.5 g |
| Boric Acid | 1.0 g |
| Diethylene Glycol | 12 g |
| Ethylenediaminetetraacetic Acid | 1.7 g |
| 5-Methylbenzotriazole | 0.06 g |
| Hydroquinone | 25 g |
| Glacial Acetic Acid | 18 g |
| Triethylene Glycol | 12 g |
| 5-Nitroindazole | 0.25 g |
| 1-Phenyl-3-pyrazolidone | 2.8 g |
| Glutaraldehyde (50 wt/wt %) | 9.86 g |
| Sodium Metabisulfite | 12.6 g |
| Potassium Bromide | 3.7 g |
| Water to make | 1.0 liter |
| Fixer: | |
| Ammonium Thiosulfate (70 wt/vol %) | 200 ml |
| Disodium Ethylenediaminetetraacetate Di-hydrate | 0.02 g |
| Sodium Sulfite | 15 g |
| Boric Acid | 10 g |
| Sodium Hydroxide | 6.7 g |
| Glacial Acetic Acid | 15 g |
| Aluminium Sulfate | 10 g |
| Sulfuric Acid (36 N) | 3.9 g |
| Water to make | 1 liter |
| pH | 4.25 |

Detectability with Sensor:

Ten sheets of the sample were inserted into the automatic developing machine through the film-inserting mouth and tested as to whether or not they were detected with the sensor.

The machine has a pair of an infrared emitter and an infrared receiver (sensor) at the film-inserting mouth, by which the film inserted into the mouth is detected if it fully cuts off the infrared ray emitted from the emitter. After the sensor has recognized the insertion of the film, the conveyer roller in the machine begins to move, by which the film is conveyed to the developer tank. For the spectral sensitivity characteristic of the infrared emitter and the infrared receiver, the description in JP-A-3-226736, page 16, left lower column (corresponding to U.S. Pat. No. 5,260,178) is referred to.

Fixability (the replenisher to the fixer was reduced to 3/4):

The replenisher to the fixer was reduced to 3/4 in the running process, and the processed sample was evaluated.

A: Not problematic in practical use

B: Problematic in practical use because of insufficient fixation

Soil of Automatic Developing Machine (the replenisher to the developer was reduced to 1/2):

The replenisher to the developer was reduced to 1/2 in the running process, and the development-fixation crossover rack was checked as to whether or not it was soiled.

A: Not problematic in practical use

B: Problematic in practical use (the rack was soiled and must be cleaned)

Applicability to Safelight:

The sample was exposed to a safelight having 8U Safelight Filter (produced by Fuji Photo Film Co., Ltd.) attached thereto, for 16 minutes, and then processed with the above-mentioned automatic developing machine. The optical density of the processed sample was measured with a Macbeth densitometer (produced by Macbeth Co.).

Handlability of Raw Photographic Material:

The surfaces of 100 sheets of the sample (8 inch×10 inch) were rubbed with gauze. The staining of the gauze, if any, was checked with the naked eye.

A: Not stained

B: Stained

The results are shown in Table 1 below.

TABLE 1

| Photographic Material Sample | Dye | Amount of Dye Coated (mg/m$^2$) | Residual Color | Detectability with Sensor (number of sheets detected with sensor) | Soil of Machine | Fixability | Applicability to Safelight | Handlability of Raw Photographic Material |
|---|---|---|---|---|---|---|---|---|
| Sample No. 1 (comparative sample) | Comparative Dye A | 20 | B | 10 | B | A | 0.23 | B |
| Sample No. 2 (comparative sample) | Comparative Dye B | 20 | B | 10 | B | A | 0.18 | B |
| Sample No. 3 (comparative sample) | Comparative Dye C | 20 | B | 0 | A | A | 0.87 | A |
| Sample No. 4 (comparative sample) | Comparative Dye D | 20 | B | 10 | A | A | 0.94 | A |
| Sample No. 5 (comparative sample) | Comparative Substance E | — | A | 10 | B | B | 0.30 | A |
| Sample No. 6 (sample of the invention) | P-1 | 20 | A | 10 | A | A | 0.20 | A |
| Sample No. 7 (sample of the invention) | P-2 | 20 | A | 10 | A | A | 0.21 | A |

TABLE 1-continued

| Photographic Material Sample | Dye | Amount of Dye Coated (mg/m²) | Residual Color | Detectability with Sensor (number of sheets detected with sensor) | Soil of Machine | Fix-ability | Applicability to Safelight | Handlability of Raw Photographic Material |
|---|---|---|---|---|---|---|---|---|
| Sample No. 8 (sample of the invention) | P-9 | 20 | A | 10 | A | A | 0.22 | A |
| Sample No. 9 (sample of the invention) | P-12 | 20 | A | 10 | A | A | 0.21 | A |
| Sample No. 10 (sample of the invention) | P-13 | 20 | A | 10 | A | A | 0.20 | A |

Comparative Dye B: Dye 1 described in JP-A-3-226736

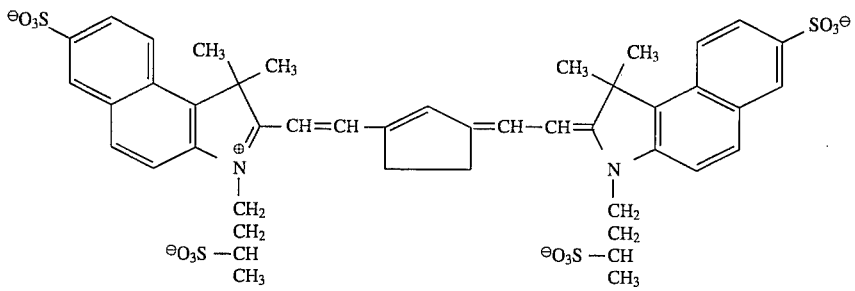

Comparative Dye C: DP-2 described in JP-A-3-37271

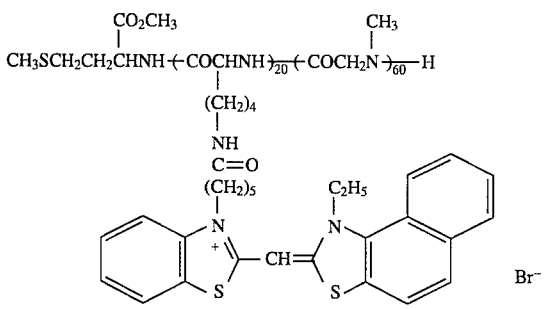

Comparative Dye D: Polymer described in JP-A-5-323550

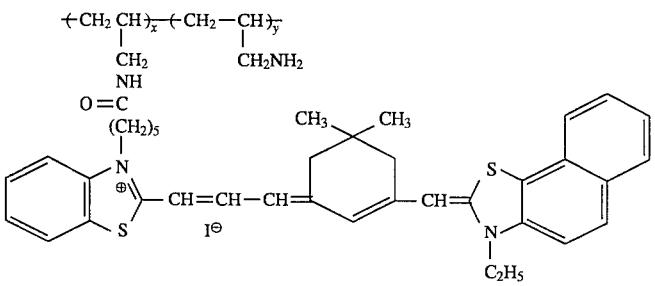

$\dfrac{x}{x+y} = 0.3 \quad x+y = 7500 \sim 11000$

Comparative Substance E:

This is an emulsion comprising light-scattering grains described in JP-A-63-131135. The grains were silver iodobromide grains having a mean grain size of 0.72 μm, and these were not chemically sensitized. The emulsion was coated in an amount of 0.22 g/m².

As is known from Table 1 above, the samples of the present invention each containing the particular dye polymer are superior to the comparative samples with respect to all the tested matters. Precisely, the former had no problematic residual color, the former were completely detected with the sensor, the former did not soil the developing machine even when the replenisher to the developer was reduced, the former were fixed well even when the replenisher to the fixer was reduced, the former were satisfactorily applicable to safelight, and the raw photographic materials of the former were handled without difficulty.

The dye polymer contained in each sample of the present invention did not cause any problematic residual color on the processed sample. The dye polymer in each sample of the present invention did not dissolve out into the processing solutions.

As has been described in detail in the above, the photographic material of the present invention has various advantages. The material can be satisfactorily detected with a sensor fitted to an automatic developing machine. The processed material has no residual color. The material does not soil an automatic developing machine to be used for processing it. The material is fixed well even when the replenisher to the fixer is reduced. The material is satisfactorily applicable to safelight. The raw photographic material is handled without difficulty.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising an anti-halation layer, a subbing layer, a protective layer, an interlayer or a backing layer which contains a dye polymer, said dye polymer comprising at least one repeating unit represented by formula (I):

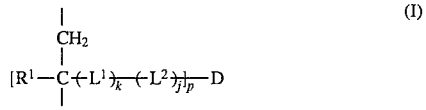

(I)

wherein $R^1$ represents a hydrogen atom, an alkyl group having from 1 to 4 carbon atoms, or a chlorine atom; $L^1$ represents —CON($R^2$)— (where $R^2$ represents a hydrogen atom, an alkyl group having from 1 to 4 carbon atoms, or a substituted alkyl group having from 1 to 6 carbon atoms), —COO—, —NHCO—, —OCO—, —$C_6H_2(R^3)(R^4)$COO— (where $R^3$ and $R^4$ each independently represent a hydrogen atom, a hydroxyl group, a halogen atom, or a substituted or unsubstituted alkyl group, a substituted or unsubstituted alkoxy group, a substituted or unsubstituted acyloxy group or a substituted or unsubstituted aryloxy group; and $C_6H_2$ represents a benzene ring with four substituents), or —$C_6H_2(R^3)(R^4)$CON($R^2$)— (where $R^2$, $R^3$, $R^4$ and $C_6H_2$ have the same meaning as above);

$L^2$ represents a linking group by which $L^1$ and D are bonded to each other;

k and j each represent 0 or 1;

p represents 1 or 2; and

D represents a cyanine dye residue.

2. A silver halide photographic material as claimed in claim 1, wherein said silver halide photographic material is a black-and-white silver halide photographic material.

3. A silver halide photographic material as claimed in claim 1, wherein said silver halide photographic material has from 0.5 g/m² to 5 g/m² of silver coated.

4. A silver halide photographic material as claimed in claim 1, wherein $L^2$ represents —($X^1$—($J^1$—$X^2$)$_r$—($J_2$—$X^3$)$_q$—($J^2$)$_s$)—, wherein $J^1$, $J^2$ and $J^3$, which may be the same or different, each represent —CO—, —$SO_2$—, —CON($R^5$)—, —$SO_2$N($R^5$)—, —N($R^5$)$R^6$—, —N($R^5$)$R^6$—N($R^7$)—, —O—, —S—, —N($R^5$)CON($R^7$)—, —N($R^5$)$SO_2$—N($R^7$)—, —COO—, —OCO—, —N($R^5$)$CO_2$—, or —N($R^5$)CO—; $R^5$ represents a hydrogen atom, an alkyl group having from 1 to 6 carbon atoms, or a substituted alkyl group having from 1 to 6 carbon atoms; $R^6$ represents an alkylene group having from 1 to 4 carbon atoms; $R^7$ represents a hydrogen atom, an alkyl group having from 1 to 6 carbon atoms, or a substituted alkyl group having from 1 to 6 carbon atoms; q, r and s each represent 0 or 1; and $X^1$, $X^2$ and $X^3$, which may be the same or different, each represent an unsubstituted or substituted alkylene group having from 1 to 10 carbon atoms, an unsubstituted or substituted aralkylene group having from 7 to 10 carbon atoms or an unsubstituted or substituted phenylene group having 6 or 10 carbon atoms, in which the alkylene moeity may be linear or branched.

5. A silver halide photographic material as claimed in claim 1, wherein D represents a residue of a cyanine dye represented by formula (III):

(III)

wherein each of $B_1$ and $B_2$ represents a basic nucleus; $L_1$, $L_2$ and $L_3$ each represent a methine group; and m represents 2, 3 or 4.

6. The silver halide photographic material as claimed in claim 1, wherein said dye polymer has an absorption peak at a wavelength falling between 750 nm and 1200 nm.

7. The silver halide photographic material as claimed in claim 1, wherein the layer containing the dye polymer is an anti-halation layer.

8. The silver halide photographic material as claimed in claim 1, wherein the layer containing the dye polymer is a subbing layer.

9. The silver halide photographic material as claimed in claim 1, wherein the layer containing the dye polymer is a protective layer.

10. The silver halide photographic material as claimed in claim 1, wherein the layer containing the dye polymer is an interlayer.

11. The silver halide photographic material as claimed in claim 1, wherein the layer containing the dye polymer is a backing layer.

* * * * *